United States Patent [19]
McCarty

[11] 3,750,120
[45] July 31, 1973

[54] METHOD AND APPARATUS FOR RECORDING INFORMATION ON AND RETRIEVING INFORMATION FROM A PNEUMATIC TIRE

[75] Inventor: John R. McCarty, Akron, Ohio

[73] Assignee: The Firestone Tire & Rubber Company, Akron, Ohio

[22] Filed: Oct. 7, 1971

[21] Appl. No.: 189,470

[52] U.S. Cl............................ 340/174.1 K, 152/330
[51] Int. Cl. .............................................. G11b 5/74
[58] Field of Search.............. 340/174.1 G, 174.1 K, 340/174.1 R; 179/100.2 A; 346/74 MP; 152/330, 355

[56] References Cited
UNITED STATES PATENTS

| | | | |
|---|---|---|---|
| 2,920,674 | 1/1960 | Bull............................ | 340/174.1 R |
| 3,232,330 | 1/1966 | Puls.................................... | 152/330 |
| 3,233,647 | 2/1966 | Newell............................... | 152/330 |
| 3,225,810 | 12/1965 | Enabit................................ | 152/330 |
| 3,460,119 | 8/1969 | Ugo et al. ........................... | 152/330 |

Primary Examiner—Vincent P. Canney
Attorney—S. M. Clark et al.

[57] ABSTRACT

A tire or a portion thereof is compounded with a magnetizable material mixed in with the conventional rubber stock. At any point during the manufacturing porcess, such as the building of the tire, a digital code is magnetically printed on the magnetic rubber by a magnetic printing head which is preferably electronically controlled but which could utilize permanent magnets. Thereafter the tire is vulcanized and eventually ready for public use with the magnetic information remaining therein. An electonically controlled magnetic reading device can be utilized to read out the recorded information at any desired time.

6 Claims, 2 Drawing Figures

INVENTOR.
JOHN R. McCARTY

METHOD AND APPARATUS FOR RECORDING INFORMATION ON AND RETRIEVING INFORMATION FROM A PNEUMATIC TIRE

BACKGROUND OF THE INVENTION

This invention relates to a method and apparatus for imprinting coded magnetic indicia on a specially prepared pneumatic tire and for reading out such indicia once recorded.

In the manufacture of automotive tires, an extremely large number of facts are generated relating to each specific tire. Such facts would include, for example, the date the tire was built, the plant, the builder number, inspection information and the like. In the past, the only means to store these facts on a tire involved the placement of ink markings thereon or actual molding-in of the information in the tire itself. Such approaches to information storage are characterized by inflexibity, cost of removal and are not amenable to convenient automatic sensing.

An initial approach to the problem is found in U.S. Pat. No. 2,920,674 wherein the bead wire in a tire or other wire possibly found in the body plies of a tire were magnetized in a coded manner representative of the information desired to be stored. While thus providing a more flexible system than those described hereinabove, numerous shortcomings of this system became apparent.

For example, due to the location of the bead wire, the magnet which was to record in information could not, in practice, be placed close enough to the bead wire. The result was that the "packing density," that is, the number of magnetic indicia per inch of wire, was very low. Rarely, for example, could more than 20 bits of information be placed on a tire having a diameter of 14 inches. Further, by placing the indicia on the bead wire, facile readout of the information was not practical since the beads of a tire are not always readily positionable in juxtaposition with a readout device.

Similarly, the beads of a tire often present magnetic discontinuities, as at the ends of the bead wire. Or if the tire includes wire body plies, these wires twist around the beads which would present a poor magnetic medium. Finally, when it becomes desirable to read the code imprinted on the beads of an inflated and mounted tire, the wheel rim itself actually mechanically and magnetically shields the beads so that readout becomes extremely difficult. In short, the magnetization of the bead wire in a tire not only failed to fully solve the problems of hand written recordation but also created new problems of its own.

In an apparent attempt to overcome some of these problems, it was suggested to impregnate chunks of magnetic material in a coded manner in the tire as it was being built, as in U.S. Pat. No. 3,225,810. The only advantage of this system, however, was that a degree of magnetic permanence was thereby established. But magnetic permanence is not always desirable as, for example, when certain proprietary information is to be recorded on the tire. When such is the case, it is important to be able to erase the recorded material prior to shipment of the tire.

This system also had other disadvantages. First, the impregnating of the magnetic chunks of material during tire building was a time consuming, tedious job. Further, only information known at the time of building could be placed in the tire. Information late obtained, as during vulcanization, could not, of course, be built into the tire. Thus, the system of U.S. Pat. No. 3,225,810 was quite limited and inflexible in nature.

SUMMARY OF THE INVENTION

It is thus a primary object of the present invention to provide a novel method and apparatus for facile magnetic recordation and readout of information stored on a tire at any time during the manufacturing process.

It is another object of the present invention to provide a method and apparatus, as above, for use on a specially prepared tire so that the information can be stored at any desired location on the tire.

It is a further object of the present invention to provide a method and apparatus, as above, which is capable of magnetically recording in a digital code an increased number of indicia per inch.

It is still another object of the present invention to provide a method and apparatus, as above, which is capable of adding, substracting, changing or reading out information at any time throughout the life of the tire.

It is yet another object of the present invention to provide a method and apparatus, as above, which electronically and automatically records and reads out the desired magnetic information.

These and other objects of the present invention which will become apparent from the written description to follow are accomplished by means hereinafter described and claimed.

In general, a tire or portion thereof is compounded of a mixture of about seven and one half percent by weight of magnetizable material such as magnetite. Thereafter a magnetic recording head is placed close to the magnetizable portion and is energized by an electronic circuit according to a predetermined code thereby imprinting a magnetic code onto the tire. As desired either the tire itself or the printing head can be rotated to imprint the information in a line around the tire. When desired, an electronically operated readout system may be employed to identify the coded information previously imprinted on the tire.

DESCRIPTION OF THE PREFERRED EMBODIMENT

Figure 1:
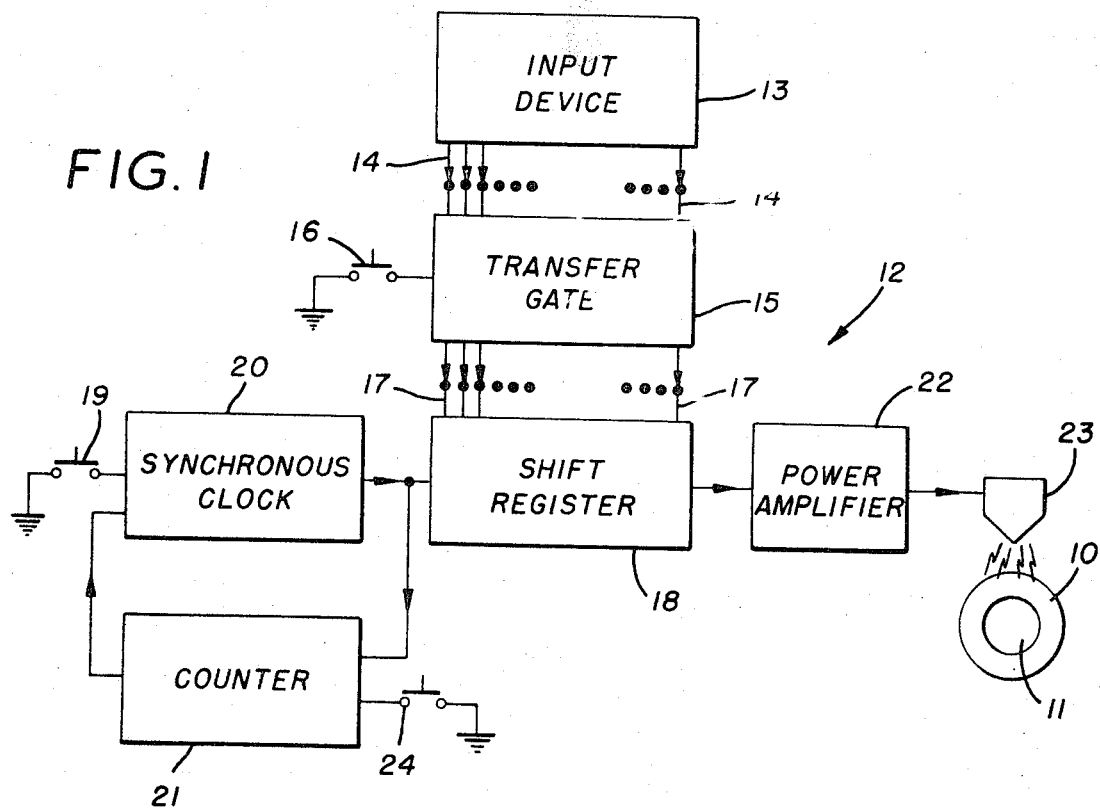
FIG. 1 is a block diagram of the write circuit according to the concept of the present invention.
Figure 2:
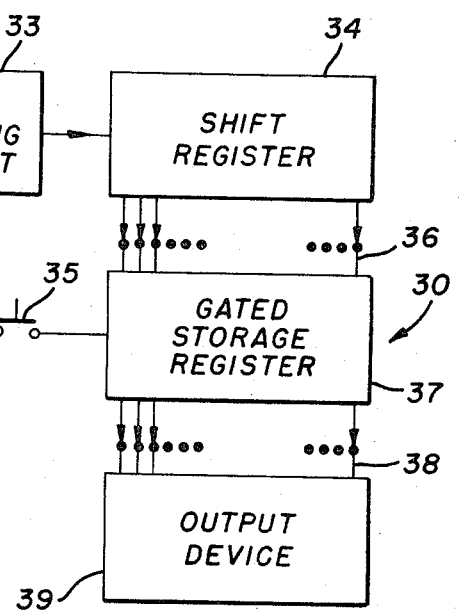
FIG. 2 is a block diagram of the read circuit according to the concept of the present invention.

A specially prepared tire having magnetic properties is indicated schematically in FIGS. 1 and 2 by the numeral 10 and is shown as on a tire building drum 11. In order to eliminate the necessity of magnetizing some metallic wire portion of the tire or implanting chunks of magnetized material in the tire, it has been found that the portion of the tire 10 which will receive the magnetic code, can be compounded with the magnetic material interspersed throughout. While almost any portion of the tire would be acceptable for receiving the magnetic information, it has been found that the sidewall area is most convenient for both reading and writing the desired indicia. Thus, during the compounding of the tire, a magnetic compound such as the magnetic oxide magnetite in its powder form is mixed with the sidewall stock. Other magnetic compounds could readily be substituted for the preferred magnetite as would be obvious to one of ordinary skill in the art. While up to 20 percent by weight may be added to the rubber without materially altering the appearance of the tire and 10 percent added without substantially altering the physical characteristics of the tire, it has been found that about seven and one half percent by weight of magnetite is sufficient to render the sidewall portion of the tire suitably magnetizable.

The specially compounded rubber is then used to make the tire 10 or a portion thereof. The magnetizable sidewall, for example, could be made in strip form and fastened to the already built tire as a veneer, or more suitably, the magnetizable portion could be made an integral part of the sidewall of the tire which is often manufactured integrally with the tread portion of the tire. At any point during the manufacture of the tire, that is, during extrusion of the rubber, actual tire building, vulcanization, or thereafter, the tire 10 could have the magnetic information placed thereon. It would only be necessary to have the write circuit components, indicated generally by the numeral 12 in FIG. 1, at the location where the imprinting is to be accomplished.

The data to be imprinted on the tire 10 is first set into an input device 13 in a binary coded form. The input device 13 could be as simple as a series of manual switches or could be more electronically sophisticated equipment such as a conventional punch card reader or even a computer. In any event, the input device 13 is designated to provide any number of bits of information as represented by data wires 14 in FIG. 1. Each wire 14 will thus carry one bit of standard digital information, that is, binary on-off or high-low signals and could be designed to carry other digital codes, for example, those employing three discreet states.

These signals are provided to a transfer gate 15 which can consist of a series of NAND gates which receive the signals from lines 14. Transfer gate 15 can be commercially purchased in modular form from numerous sources including Datascan, Inc. of Clifton, N.J., their particular designation being Module No. 289. The other input to each of the NAND gates within transfer gate 15 comes from a data transfer switch 16 which when activated allows the NAND gates to transfer the signals through lines 17 to a conventional shift register 18, which can be a Datascan Module No. 248.

The total information will remain stationary in shift register 18 until the start button 19 is depressed at which time a conventional synchronous clock or oscillator 20, which can be a Datascan Module No. 262, starts sending pulses to the shift register 18 and a counter 21. The counter 21 can be a Datascan Module No. 248 and serves to count the pulses from clock 20. Each pulse from clock 20 steps the digitally coded data serially from the shift register 18 through a conventional power amplifier 22 which boosts the signals from shift register 18 into a usable range for the magnetic write head 23 which radiates an electromagnetic pulse to the tire 10 on each count of the clock 20. The magnetic write head 23 is a conventional item including a coil wrapped around a core such as can be purchased from Nortronics Co., Inc. of N. Minneapolis, Minnesota, Model No. 9104. The information from shift register 18 is serially transferred to the head 23, although it is evident that multiple heads could be employed without the necessity for the shifter register 18, clock 20 and its associated elements, and a parallel transfer of information developed. Head 23 should be placed as close as possible to the tire or portion thereof which contains the magnetic material so that the best possible magnetic coupling is achieved.

Thus, on each pulse of clock 20, the shift register 18 sends one bit of information to write head 23 and at the same time the drum 11 is rotated so that the information is placed on the tire. Of course, it should be evident that the head 23 could be rotated about a stationary drum 11. But when the drum 11 is rotated, its speed must be carefully coordinated with the frequency of the clock 20 so that the number of bits per inch on the tire is practical. It has been found that with a single head 23, four bits per inch can be obtained on the rubber which is approximately seven and one half percent by weight magnetite.

This process continues until the counter 21, which receives pulses from the clock 20, receives the desired number of counts which would, of course, correspond to the number of lines 14 or 17 being utilized. At this time the counter 21 has turned off the clock 20 and the shift register 18 is deactivated. Thereafter the counter reset button 27 is depressed to reset the counter so that the system is ready for another cycle. It would be evident to one skilled in the art that an automatic type of reset system could be utilized by employing a feed back system from the magnet head 23.

Thus at any point in the steps of manufacturing a tire, the above described circuitry could be employed to imprint information onto the tire. Similarly, if information was erroneously magnetically printed on the tire, it can be decreased or erased with conventional alternating magnetic fields and can be changed with another write circuitry 12. Finally, by employing the read circuitry indicated generally by the numeral 30, in FIG. 2, information placed on the tire 10 can be retrieved.

Read circuit 30 consists of a magnetic pickup 31 which can be identical to the magnetic head 23 and which receives the magnetic signals serially from the tire. These signals pass through an operational amplifier 32, such as that manufactured by Fairchild Semiconductor, Mountain View, California, Model MA709C, and onto a wave shaping circuit 33 which can be another Fairchild operational amplifier used in conjunction with a Datascan Module No. 201. This information is then sent to a shift register 34 which can be similar to shift register 18.

When a read button 35 is depressed, the data from shift register 34 is gated on lines 36 through a conventional storage register 37, such as a Datascan Module No. 226, and on through lines 38 to any of a number of typical output devices 39. One such output device could merely be a series of light drivers and lights which would visually indicate the binary code being read; another type of output device could be a printer, computer, or the like.

It should be evident to one skilled in the art that the above described apparatus and method will advantageously imprint and readout magnetic information in a specially prepared tire and as such will substantially improve the tire identification art.

I claim:

1. A method of manufacturing a tire with coded information imprinted thereon comprising the steps of constructing at least a portion of a tire with a magnetizable compound mixed and interspersed therein thereby rendering the entire said portion of the tire a complete and continuous magnetizable medium, thereafter magnetically imprinting for subsequent retrieval a digital code on said portion of the tire containing said magnetizable compound to magnetize selective portions of said magnetizable medium.

2. A method according to claim 1 wherein the imprinting step takes place during the building of the tire and includes the step of rotating the tire on the building drum with a magnetic printing head in juxtaposition with said portion of the tire containing said magnetizable compound.

3. A method according to claim 2 including the step of electronically feeding said magnetic printing head with the signals corresponding to the coded information.

4. A tire having a sidewall, at least a portion of the sidewall comprising, a mixture of magnetizable material and rubber thereby forming a continuous magnetic medium, said magnetizable material being in a powder form interspersed throughout the portion of the sidewall and consisting of up to 20 percent by weight of the portion of the sidewall.

5. A tire according to claim 4 wherein the magnetizable material is magnetite and is 7½ percent by weight of the portion of sidewall.

6. A tire according to claim 4 wherein bits of information are coded onto the magnetic medium to magnetize the material.

* * * * *